United States Patent
Hoffmann et al.

(10) Patent No.: US 11,617,236 B2
(45) Date of Patent: Mar. 28, 2023

(54) INDUCTION HOB AND METHOD FOR CONTROLLING AN INDUCTION HOB

(71) Applicant: ELECTROLUX APPLIANCES AKTIEBOLAG, Stockholm (SE)

(72) Inventors: Harald Hoffmann, Rothenberg ob der Tauber (DE); Jochen Holzinger, Rothenberg ob der Tauber (DE); Gerhard Klein, Rothenberg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 572 days.

(21) Appl. No.: 16/344,839

(22) PCT Filed: Sep. 22, 2017

(86) PCT No.: PCT/EP2017/074001
§ 371 (c)(1),
(2) Date: Apr. 25, 2019

(87) PCT Pub. No.: WO2018/077548
PCT Pub. Date: May 3, 2018

(65) Prior Publication Data
US 2019/0261467 A1    Aug. 22, 2019

(30) Foreign Application Priority Data
Oct. 25, 2016   (EP) .................... 16195637

(51) Int. Cl.
*H05B 6/06* (2006.01)
*H05B 6/12* (2006.01)

(52) U.S. Cl.
CPC ............. *H05B 6/065* (2013.01); *H05B 6/062* (2013.01); *H05B 6/1272* (2013.01); *H05B 2213/05* (2013.01); *Y02B 40/00* (2013.01)

(58) Field of Classification Search
CPC .... H05B 2213/05; H05B 6/062; H05B 6/065; H05B 6/1272; H05B 3/746; H05B 3/68; Y02B 40/00
See application file for complete search history.

(56) References Cited

U.S. PATENT DOCUMENTS 5,183,996 A * 2/1993 Hazan .................. F24C 15/108
                                                    219/445.1
9,131,539 B2 * 9/2015 Fujinami ................ H05B 6/062
(Continued)

FOREIGN PATENT DOCUMENTS

DE    102010031225 A1 *  2/2011   ............. H05B 6/062
EP       3429120 A2        5/1991
(Continued)

OTHER PUBLICATIONS

"Grande, Method for detecting cookware on a matrix hob, 2010" (Year: 2010).*
(Continued)

*Primary Examiner* — Brian W Jennison
*Assistant Examiner* — Abigail H Rhue
(74) *Attorney, Agent, or Firm* — Pearne & Gordon LLP

(57) ABSTRACT

The invention relates to an induction hob comprising: a hob plate (2); two or more induction coils (3) arranged below the hob plate in order to form heating zones (4) at the hob plate (2); one or more pot detection sensors (5), the pot detection sensors (5) being at least partially placed between a pair of adjacent induction coils (3); wherein the pot detection sensor (5) is a strip-shaped sensor extending in a space between said pair of adjacent induction coils (3) and the pot detection sensor (5) is coupled with an evaluation unit (8) adapted to determine information regarding the coverage of the pot detection sensor (5).

24 Claims, 4 Drawing Sheets

(56) References Cited

U.S. PATENT DOCUMENTS

| | | | | |
|---|---|---|---|---|
| 9,609,697 | B2* | 3/2017 | Aldana Arjol | H05B 6/065 |
| 10,009,960 | B2* | 6/2018 | Artal Lahoz | H05B 6/065 |
| 10,433,375 | B2* | 10/2019 | Lomp | H05B 6/36 |
| 2013/0175254 | A1 | 7/2013 | Bach et al. | |
| 2016/0037585 | A1* | 2/2016 | Christiansen | H05B 6/065 |
| | | | | 219/626 |
| 2016/0095169 | A1* | 3/2016 | Sanchez | H05B 6/062 |
| | | | | 219/622 |
| 2016/0330799 | A1* | 11/2016 | Leyh | H01F 5/00 |

FOREIGN PATENT DOCUMENTS

| | | | | |
|---|---|---|---|---|
| EP | 2242328 | A2 * | 10/2010 | ............ H05B 3/74 |
| EP | 2378836 | A1 | 10/2011 | |
| EP | 2741571 | A1 | 6/2014 | |
| EP | 2914061 | A1 * | 9/2015 | ............ H05B 6/062 |
| EP | 2914061 | A1 | 9/2015 | |
| EP | 2925088 | A1 | 9/2015 | |

OTHER PUBLICATIONS

International Search Report and Written Opinion in PCT/EP2017/074001 dated Dec. 19, 2017, 9 pages.

* cited by examiner

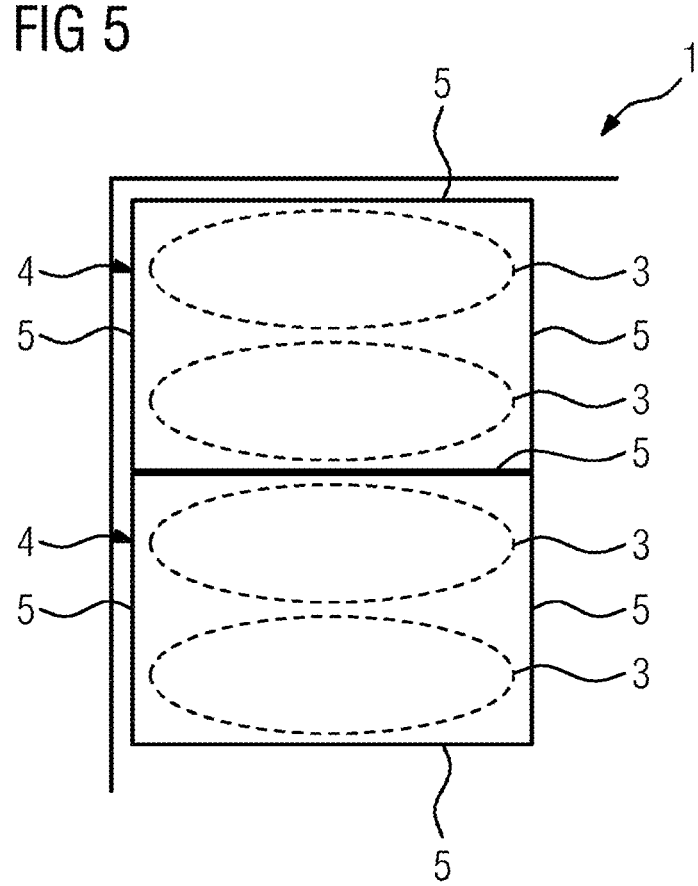

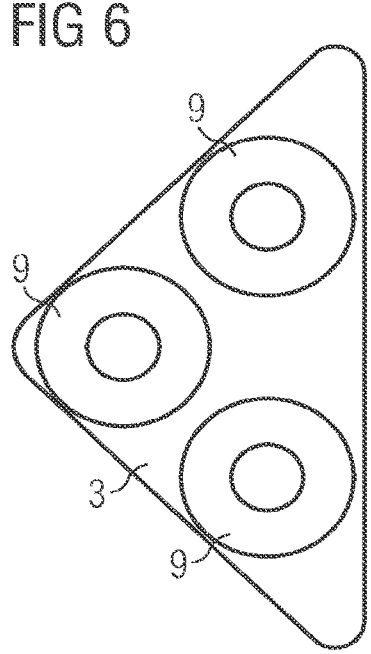
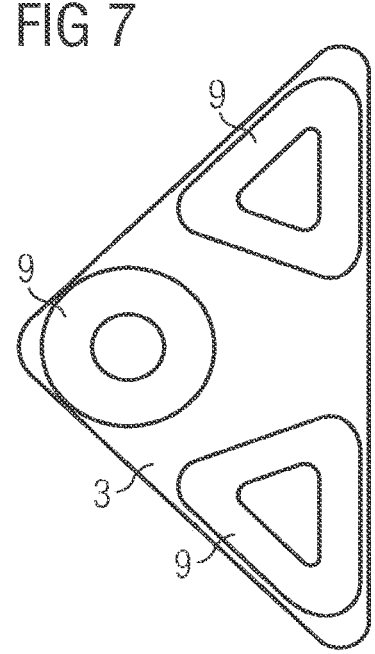
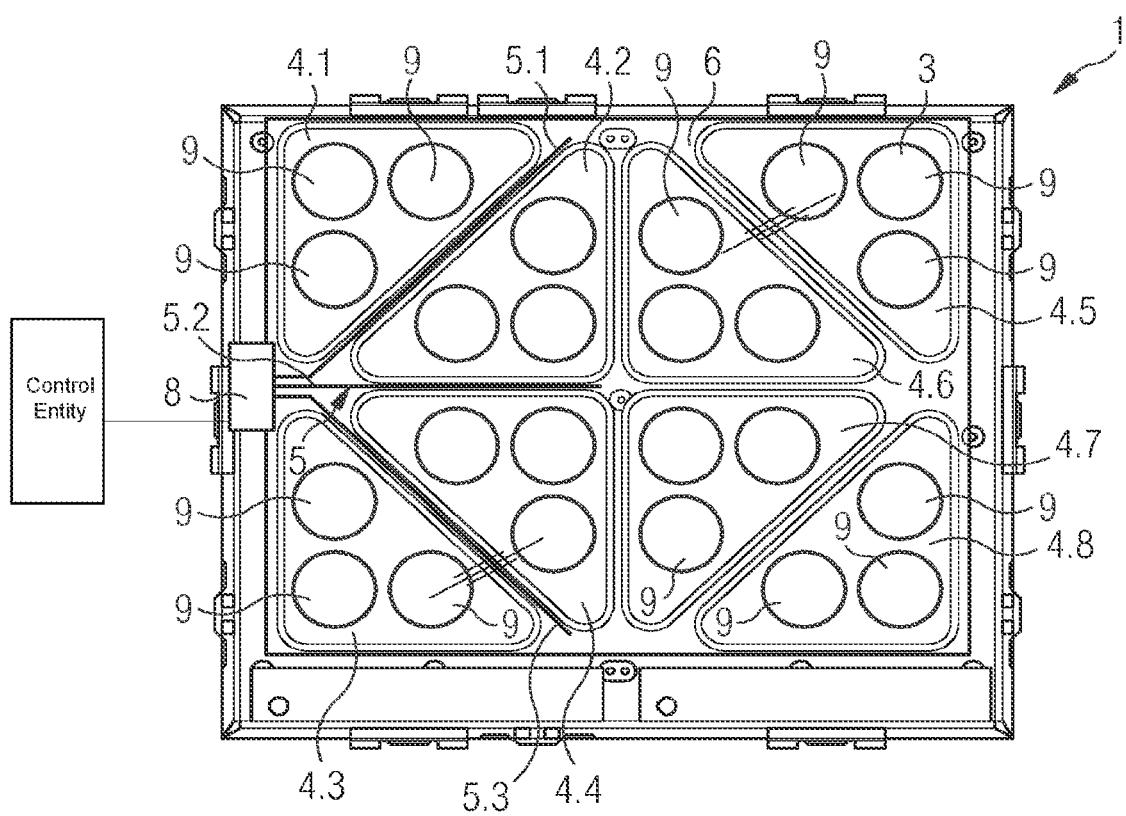

INDUCTION HOB AND METHOD FOR CONTROLLING AN INDUCTION HOB

The present invention relates generally to the field of induction hobs. More specifically, the present invention is related to an induction hob including pot detection sensors for determining the position and/or size of a piece of cookware.

BACKGROUND OF THE INVENTION

Induction hobs for preparing food are well known in the prior art. Induction hobs typically comprise at least one heating zone which is associated with at least one induction coil. For heating a piece of cookware placed on the heating zone, the induction coil is coupled with electronic driving means, in the following referred to as power unit, for driving an AC current through the induction coil.

Induction hobs are known which comprise multiple heating zones, each heating zone being associated with one or more induction coils. In order to be able to heat large-sized pieces of cookware, two or more heating zones can be merged in order to form a heating zone area according to the base area of the piece of cookware placed on the induction hob.

However, known induction hobs use information derivable at the power unit to determine the presence of a piece of cookware. Due to the presence of a piece of cookware, there is an inductive coupling between the induction coil and the piece of cookware which leads to variations of the electrical values within the power unit. By monitoring one or more electrical values, the coverage of induction coils can be determined. However, by using information of the induction coils it is, for example, not possible to determine whether two small-size pieces of cookware are placed on a pair of induction coils or a large-sized piece of cookware covers said pair of induction coils.

SUMMARY OF THE INVENTION

It is an objective of the embodiments of the present invention to provide effective means for detecting the position and/or size of a piece of cookware at an induction hob. If not explicitly indicated otherwise, embodiments of the invention can be freely combined with each other.

According to a first aspect, the invention relates to an induction hob comprising a hob plate, one or more induction coils arranged below the hob plate in order to form at least one heating zone at the hob plate, one or more pot detection sensor and an evaluation unit for evaluating signals received from the pot detection sensor. The pot detection sensor is a strip-shaped sensor extending at least partially along a dedicated area of the hob plate, such as in a space between adjacent induction coils, or in proximity to a heat sensitive area of the hob plate, such as an area where there is provided an input element, a display element or the like. The evaluation unit can be adapted to determine information regarding the coverage of the pot detection sensor. The evaluation unit may be a unit independent of a control entity of the induction hob or may be included in said control entity.

In accordance with the present invention no punctual sensors are used but strip-shaped sensors comprising significant spatial extent. Based on said strip-shaped pot detection sensors, information regarding the spatial extent of a piece of cookware can be derived because the pot detection sensors are able to provide information regarding their coverage, i.e. for example, information indicating which percentage of the pot detection sensor is covered by the piece of cookware.

According to preferred embodiments, the evaluation unit is adapted to determine the occupancy level of the pot detection sensor, said occupancy level being indicative for the portion of the pot detection sensor covered by a pot placed above said pot detection sensor. For example, the evaluation unit may directly receive electrical values (e.g. voltage values) of one or more pot detection sensors and may be adapted to determine the occupancy level, for example based on a lookup table. The occupancy level may be indicative for the portion of the pot detection sensor covered by the piece of cookware in relation to the whole measurement area of the pot detection sensor.

According to preferred embodiments, the pot detection sensor is a capacity sensor. Thus, based on the presence of the piece of cookware and depending on the coverage of the pot detection sensor, the capacitance value of the pot detection sensor changes and said capacitance value can be used as a measure indicating the coverage of the pot detection sensor.

According to preferred embodiments, the pot detection sensor comprises at least partially a straight shape. In other words, the pot detection sensor may at least partially extend linear at the hob plate. For example, linear pot detection sensors may be arranged between adjacent induction coils and can be used to detect whether a piece of cookware covers both adjacent induction coils. According to a further embodiment, multiple pot detection sensors are arranged in a star-like arrangement, i.e. the linear pot detection sensors start in one or essentially in one point and diverge in different directions.

According to preferred embodiments, the dedicated area is selected from a heating zone, an individual induction coil, an area between adjacent heating zones; a heat sensitive area, an input element, a display element, a fixing element, a sealing element, and an edge of the hob plate.

By evaluating signals received from the pot detection sensors it thus is possible to detect whether a pot is located above one or more heating zones, or partially above a heating zone, or above a heat sensitive element such as an operational element, for example a switch element or a display element, or a constructional element, such as a fixing that is glued to the bottom side of the hob plate, or such that the a portion of the pot projects beyond an edge of the hob plate. Furthermore, by providing one or more sensors that extend substantially all along the circumference of a heating zone, and evaluating the coverage of the pot sensors, it is possible to detect whether a pot is located centrally above the heating zone. Thus, if it is detected that such sensor or sensors are completely covered, it can be assured that the pot is located fully above the heating zone. However, a complete covering of such sensors also can indicate that the pot is too large for the selected cooking zone and thus a message can be provided to the user to use a larger cooking zone. On the other hand, if it is detected that only a part of the sensors is covered, this indicates that the pot is not correctly placed on the heating zone and thus should be shifted more centrally.

In preferred embodiments, there can be provided more than one pot detection sensor along a single dedicated area, which not only allows determining a percentage of coverage of the pot detection sensors, but further facilitates detecting the position of where the sensors are covered.

According to preferred embodiments, the one or more pot detection sensor can be arranged along a dedicated area of straight shape, rounded shape, circular shape, oval shape or generally rectangular shape.

According to preferred embodiments, the pot detection sensor is formed by a printed line sensor arranged at a carrier plate carrying said one or more induction coils. Said printed line sensor may be directly placed on the carrier plate or may be provided at a circuit board arranged at said carrier plate. Thereby, the effort for installing the pot detection sensor is significantly reduced.

Preferably, said carrier plate is thermally insulating, electrically isolating and/or provided for carrying further electric and/or electronic components. A carrier plate, which is thermally insulating as well as electrically isolating, allows the production of the cooking hob by low complexity. In particular, flat electric and/or electronic components may be arranged on the carrier plate. For example, one or more sensors and light bars may be arranged on the carrier plate.

Further, at least two adjacent induction coils may have a triangular shape in each case, wherein preferably each of said induction coils includes at least three coils. For example, said coils have the same sizes and/or are constructed in the same way. The use of only one type of coils allows the production of the induction coil by low complexity. Moreover, two adjacent triangular induction coils may form a rectangular or square cooking zone.

In particular, at least one of the induction coils can include three coils, wherein each coil corresponds with one angle of said induction coil. For example, the coils can have the same sizes and can be constructed in the same way. The use of only one type of coils allows the production of the induction coil by low complexity. Preferably, the coils have circular, elliptic and/or triangular shapes. In particular the coils included in one induction coil can be connected together either by series or parallel electrical connections. In a preferred embodiment at least two, preferably all, of the coils included in one induction coil are connected together by series electrical connections. In an equally preferred embodiment at least two, preferably all, of the coils are connected together by parallel electrical connections.

According to preferred embodiments, the induction hob comprises a control entity adapted to automatically form a heating zone area including any of said induction coils based on information provided by the evaluation unit. The control entity may be a central control entity of the induction hob or may be a separate control entity independent of the central control entity. Thereby, an automatic formation of a greater heating zone area comprising multiple smaller heating zones (each including one or more induction coils) is achieved.

In preferred embodiments, the induction hob comprises signalling means for outputting an optic and/or acoustic message based on information provided by the evaluation unit. In more simple embodiments the signalling means can be a warning light or a beeper. In more sophisticated embodiments the signalling means can be a user interface that provides for an optic or acoustic message which provides a warning message or a suggestion to the user based on the evaluation of the sensor signals, such as an indication of what measures are to be taken.

According to preferred embodiments, the control entity receives information regarding the occupancy level of one or more pot detection sensors positioned between a pair of adjacent induction coils and compares the received occupancy level information with a threshold level in order to decide whether two pieces of cookware are placed on different heating zones which have to be driven independently or a single piece of cookware covers multiple heating zones and said multiple heating zones have to be combined in order to form a common heating zone area. For example, if the coverage of the pot detection sensor(s) is above a certain threshold, it is assumed that a piece of cookware covers the heating zones arranged on both sides next to the pot detection sensor and said heating zones can be merged to form a common heating zone area. On the other hand, if the coverage of the pot detection sensor is below said threshold, it is assumed that only a minor part of the piece of cookware is placed above the pot detection sensor and no merging of heating zones is initiated.

According to preferred embodiments, the control entity is additionally adapted to receive pot identification information from one or more induction coils and to evaluate said pot identification information for forming the heating zone area. As mentioned before, also the induction coils, specifically the power units powering the induction coils may provide information which can be used for pot detection. By combining the pot identification information of one or more induction coils and the information of the pot detection sensors, the accuracy of the detection mechanism can be significantly improved.

According to a further preferred embodiment there is provided a plurality of strip-shaped pot detection sensors that are arranged as a matrix throughout the hob plate. Thus, rather than providing for pot detection sensors that are assigned to certain components of the induction hob, there can be provided a matrix of strip-shaped pot detection sensors that allow detecting the position of cook ware in relation to all dedicated areas of interest, such as heating zones, operational elements, constructional elements or the boundaries of the hob plate.

In this manner the

According to a second aspect, the invention relates to a method for controlling an induction hob. As explained before, the induction hob comprises a hob plate, one or more induction coils arranged below the hob plate in order to form at least one heating zone at the hob plate and one or more pot detection sensors. Said pot detection sensors are strip-shaped sensors extending at least partially along a dedicated area of the hob plate, such as along a heat sensitive area or between a pair of adjacent induction coils. Furthermore, the induction hob comprises an evaluation unit coupled with the one or more pot detection sensors. The method comprises the steps of:

receiving information regarding the coverage of the one or more pot detection sensors at the evaluation unit;

analysing the received coverage information thereby deriving information regarding the position and/or size of the piece of cookware placed on the hob plate; and controlling the induction hob according to the derived position and/or size information.

According to embodiments, the step of controlling the induction hob comprises triggering a heating zone formation procedure and/or triggering an output at a user interface regarding the position of the piece of cookware. Thus, based on the received coverage information multiple heating zones can be merged to a common heating zone area, or vice versa an initially larger common heating zone area can be split into two or more individual smaller heating zone areas. Alternatively or additionally an information may be provided to the user which indicates that the piece of cookware should be relocated to a position that either provides for a better energy transfer from the induction coils to the piece of cookware, or where the piece of cookware does not interfere with other components of the induction hob, such as operational or constructional elements that should be prevented from extended exposure to heat radiated from the cookware.

According to embodiments, a control entity included in the induction hob receives information regarding the occupancy level of one or more pot detection sensors positioned between a pair of adjacent induction coils and compares the received occupancy level information with a threshold level in order to decide whether two pieces of cookware are placed on the hob plate and have to be driven independently or a single piece of cookware covers multiple heating zones and said multiple heating zones have to be combined in order to form a common heating zone area.

According to embodiments, the control entity additionally receives pot identification information from one or more induction coils and evaluates said pot identification information for forming the heating zone area.

According to embodiments, a control entity included in the induction hob receives information regarding the occupancy level of one or more pot detection sensors and compares the received occupancy level information with a threshold level in order to decide whether the position of the piece of cookware is outside a desired area and information regarding a repositioning of the piece of cookware should be provided at a user interface. Thereby, based on the information derived from the pot detection sensor, the user can be automatically informed regarding an unfavourable positioning of cookware that may cause a low heating efficiency or adverse effects on heat sensitive components of the induction hob and regarding a repositioning of the piece of cookware.

The term "essentially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which:

FIG. 5 shows a schematic arrangement of rectangular pot detection sensors surrounding groups of induction coils;

FIG. 6 shows a first embodiment of an internal structure of the induction coils of the example arrangement of FIG. 2;

FIG. 7 shows a second embodiment of the internal structure of the induction coils of the example arrangement of FIG. 2; and FIG. 8 shows the example arrangement of FIG. 2, wherein the inductions coils have the internal structure according to the first embodiment.

DETAILED DESCRIPTION OF PREFERRED EMBODIMENTS

Figure 1:
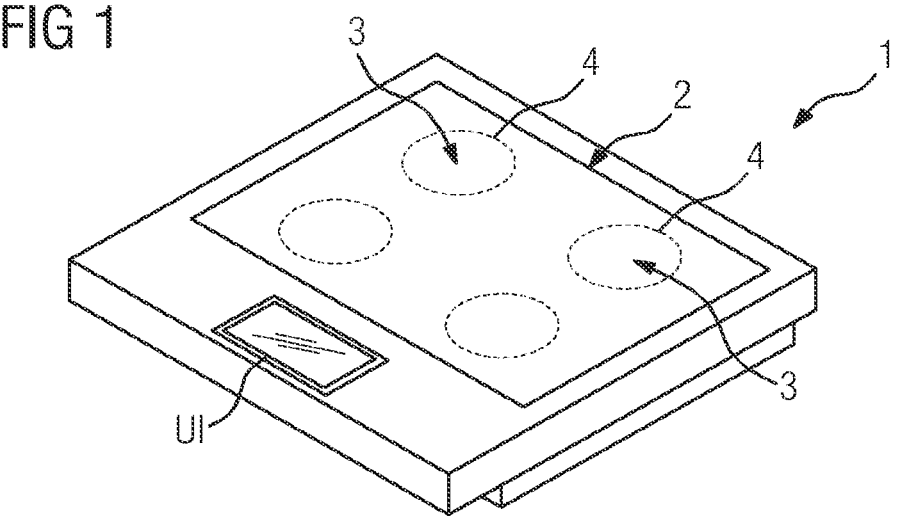
FIG. 1 shows a schematic view of an induction hob according to the current invention.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

FIG. 1 shows a schematic illustration of an induction hob 1. The induction hob 1 comprises multiple heating zones 4 preferably provided at a common hob plate 2. Each heating zone is correlated with at least one induction coil 3 placed beneath the hob plate 2. The induction hob 1 may further comprise a user interface UI for receiving user input and/or providing information, specifically graphical information to the user.

Figure 2:
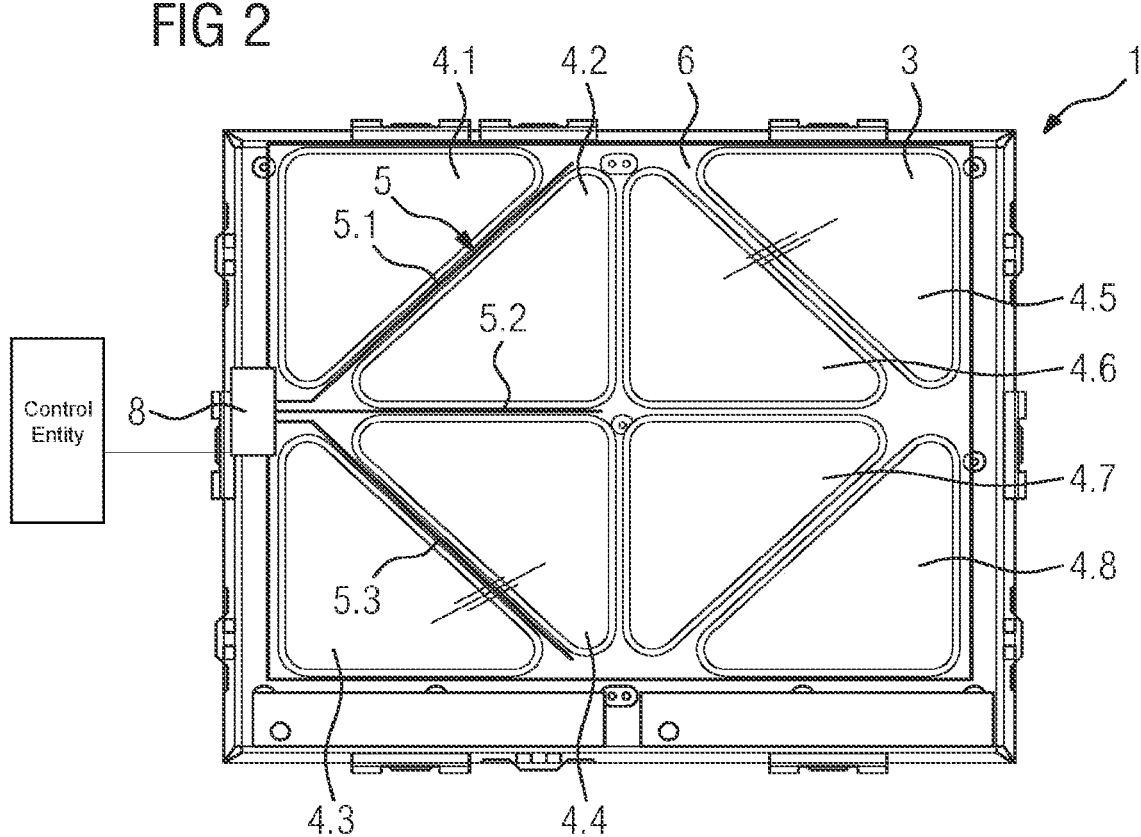
FIG. 2 shows an example arrangement of multiple induction coils and pot detection sensors placed between said induction coils in an induction hob.

FIG. 2 shows an induction hob 1 including multiple induction coils 3 with a removed hob plate 2. The induction coils 3 are spatially distributed over the induction hob base area. The induction coils 3 may be arranged at a carrier plate 6. In order to form heating zones 4 which can be adapted to the base area of the respective piece of cookware placed on the hob plate 2, the induction hob 1 implements a flexible heating zone concept. Using said flexible heating zone concept, the induction hob is configured to form heating zone areas by merging two or more heating zones 4 thereby creating large-size heating zone areas spanning over multiple heating zones 4.

According to the embodiment of FIG. 2, the induction hob 1 may comprise eight heating zones 4.1 to 4.8, each heating zone 4.1 to 4.8 being associated with a certain induction coil 3. According to other embodiments, each heating zone 4.1 to 4.8 may be associated with two or more induction coils 3. In a basic configuration, each induction coil 3 (respectively the induction coils 3 associated with a certain heating zone 4) is operated separately. Thereby, a plurality of small size heating zones 4.1 to 4.8 can be formed which can be used for heating cookware with small-size base areas.

However, in order to form heating zone areas with a greater base area, two or more heating zones 4.1 to 4.8 can be coupled and operated simultaneously (e.g. with the same heating level) in order to heat pieces of cookware with a base area greater than the single heating zone 4.1 to 4.8. For example, in the embodiment of FIG. 2, the heating zones 4.1, 4.2 and the corresponding induction coils 3 comprising a triangular shape can be combined to form a square heating zone area. Similarly, the heating zones 4.1 to 4.4 can be combined to form a rectangular heating zone area for heating a piece of cookware 7 (indicated by the oval in FIG. 3).

In order to be able to detect the heating zones 4.1 to 4.8 to be merged to a common heating zone area, the induction hob 1 comprises one or more pot detection sensors 5. Said pot detection sensors 5 are formed by strip-shaped sensors (sensor lines) extending between adjacent induction coils 3. More in detail, between the single heating zones 4.1 to 4.8, respectively, the induction coils 3 being associated with said heating zones 4.1 to 4.8, a space is formed which is not covered by said induction coils 3. Within said space, the pot detection sensors 5 are arranged.

Said pot detection sensors 5 may be capacity sensors, i.e. sensors working according the capacitance measurement principle. In other words, the capacity of the respective pot detection sensor 5 may change according to the portion of the pot detection sensor 5 which is covered by the piece of cookware. So, by means of said pot detection sensor 5 it is not only possible to determine if a piece of cookware is placed above the pot detection sensor 5 but it is also possible to determine the occupancy level of the pot detection sensor 5 (e.g. the percentage indicating the covered pot detection sensor portion with respect to the whole pot detection sensor length).

The pot detection sensors 5 are coupled with an evaluation unit 8. Said evaluation unit 8 receives electrical information provided by the pot detection sensors 5. For example, the evaluation unit 8 may be adapted to analyse the electrical information provided by the pot detection sensors 5 and forward pot detection information of each pot detection sensor 5 towards a control entity (not shown) of the induction hob 1. In other words, the evaluation unit 8 may translate said electrical information provided by the pot detection sensors 5 in a suitable format required by the control entity. The control entity may be able to merge two or more heating zones 4.1 to 4.8 based on said forwarded pot detection information. According to embodiments, the evaluation unit 8 may be a unit separated from the control entity. However, according to other embodiments, the evaluation unit 8 may be included in the control entity (i.e. the evaluation unit 8 is an integral part of the control entity).

For example, the pot detection information provided by the evaluation unit 8 may be used to evaluate if a significant portion of a piece of cookware is placed above a pot detection sensor 5. For example, the control entity may include one or more threshold levels which are used for deciding whether a certain occupancy level of the pot detection sensor 5 leads to a merging of two or more heating zones 4.1 to 4.8. For example, the threshold for deciding that a single piece of cookware overlaps between two heating zones 4.1 to 4.8 may be 20%. So, if the occupancy level is below 20%, the control entity may decide not to merge the heating zones 4.1 to 4.8. If the occupancy level is above 20%, the control entity may decide to merge two or more heating zones to a single heating zone area. Of course, also other threshold values may be possible.

Figure 3:
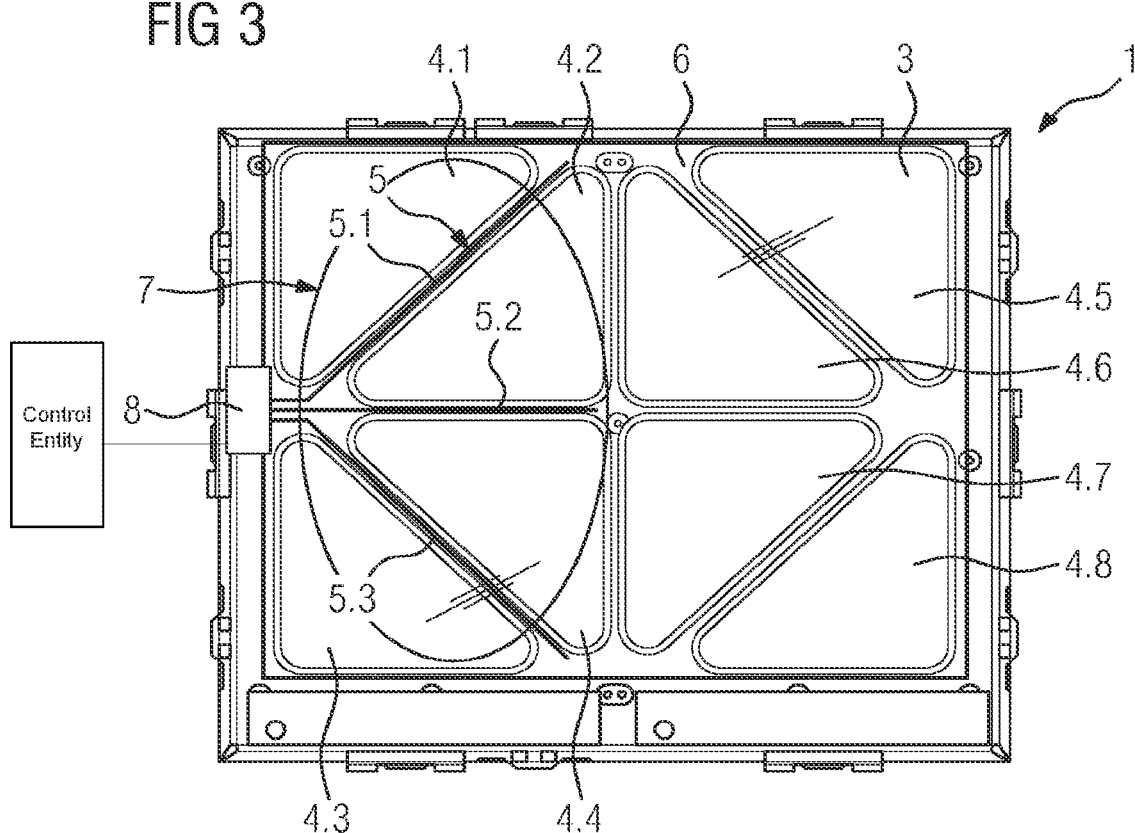
FIG. 3 shows the example arrangement of FIG. 2 which is used for forming a common heating zone area for heating a large-size piece of cookware.

FIG. 3 shows the embodiment of FIG. 2, which is in the following used to explain the merging algorithm more in detail. The oval indicates a piece of cookware 7 covering the heating zones 4.1 to 4.4 and three pot detection sensors 5.1, 5.2, 5.3. In the present case, each pot detection sensor 5.1, 5.2, 5.3 may indicate an occupancy level above the threshold level (e.g. threshold=20%). Therefore, the control entity may decide to merge the heating zones 4.1 to 4.4 to a common heating zone area.

In contrary thereto, in case that two different pieces of cookware are placed on the hob plate 2 and a first piece of cookware covers the heating zones 4.1, 4.2 and a second piece of cookware covers the heating zones 4.3, 4.4, the pot detection sensors 5.1, 5.3 may indicate an occupancy level above the threshold level, but the pot detection sensor 5.2 may indicate an occupancy level below said threshold level. Thereby it is possible to recognize that there is no piece of cookware which is placed with a significant extent above the pot detection sensor 5.2. Thereby it can be concluded that two pieces of cookware are placed above the heating zones 4.1 to 4.4.

In order to increase the decision accuracy of the pot detection mechanism, the information provided by the pot detection sensors 5 may be combined with pot detection information provided by the induction coils 3. For example, the power circuit powering one or more induction coils 3 may comprise means for pot detection. Said power circuit may be coupled with the control entity in order to provide further pot detection information (e.g. derived by monitoring electrical parameters within the power circuit). Thereby, it is possible not only to consider information of the pot detection sensors 5 located between adjacent induction coils 3 but information derived in the area of the induction coil itself for automatically forming heating zone areas adapted to the size and shape of the piece of cookware.

In addition, based on the algorithm it is also possible to determine whether the piece of cookware is placed in a desired position for an effective cooking process. More in detail, based on the information regarding the occupancy levels of the respective pot detection sensors 5.1, 5.2, 5.3 it is possible to determine the position of the piece of cookware. Said position information may be used to determine whether the piece of cookware is placed in a desired position on the heating zone area formed by one or more heating zones 4.1 to 4.4.

Figure 4:
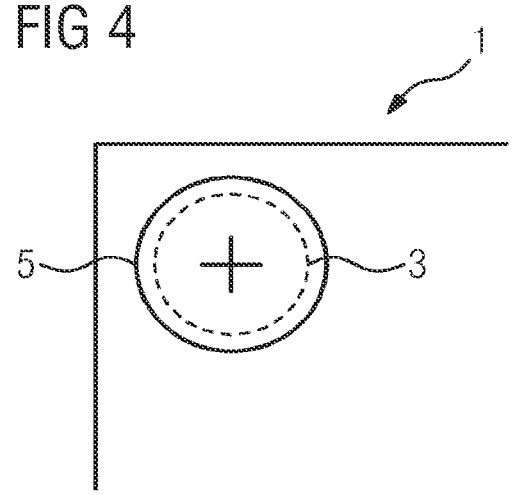
FIG. 4 shows a schematic arrangement of a pot detection sensor surrounding a circular induction coil.

FIGS. 4 and 5 show further embodiments using pot detection sensors 5 (indicated by solid lines) which are arranged around one or more induction coils 3 (indicated by dashed lines). The pot detection sensors 5 may be arranged at a certain distance around the induction coil 3, respectively, around an arrangement of multiple induction coils 3. More in detail, FIG. 4 shows an embodiment in which a single induction coil 3 is surrounded by a strip-shaped pot detection sensor 5 at a certain distance. The induction coil 3 may comprise a circular shape and the pot detection sensor 5 may be arranged at a certain radial distance to the edge of the induction coil 3 in order to form the heating zone 4. In the embodiment of FIG. 5, multiple induction coils 3 are grouped in several heating zones 4 by circumferentially arranged pot detection sensors 5. The pot detection sensors 5 may have a circular, oval or rectangular form.

Based on such circumferentially arranged pot detection sensors 5, it is possible to determine whether a piece of cookware is placed in a suitable position on the heating zone 4. It is worth mentioning that the heating of the piece of cookware is not optimal if the piece of cookware is not centred on the induction coil/group of induction coils. So, the circumferentially arranged pot detection sensor 5 can be used to determine whether the piece of cookware is placed at the heating zone 4 in a desired position. Specifically, by means of the pot detection sensor 5 it can be detected whether the piece of cookware is placed at least partially on the pot detection sensor 5. As already described before, it is also possible to determine the occupancy level of the pot detection sensor 5, i.e. the portion of the pot detection sensor 5 covered by the piece of cookware. For example, the occupancy level may be compared with a threshold in order to trigger the provision of information (optical information, acoustic information etc.) at a user interface in order to inform the user of the induction hob regarding the non-ideal positioning of the piece of cookware.

FIG. 6 shows a first embodiment of an internal structure of the induction coil 3 of the example arrangement of FIG. 2.

The induction coil 3 is triangular and includes one right angle and two acute angles. In this embodiment, the induction coil 3 includes three coils 9, wherein each coil 9 is arranged within one angle of said induction coil 3. In this embodiment, the three coils 9 are circular, have the same sizes and are constructed in the same way. The use of only one type of coils 9 allows the production of the induction coil 3 by low complexity. In general, the induction coil 3 includes three or more coils 9. Preferably, the triangular induction coil 3 includes three, six or ten coils 9, if said coils have the same sizes and are equally distributed within said triangular induction coil 3.

FIG. 7 shows a second embodiment of the internal structure of the induction coil 3 of the example arrangement of FIG. 2.

The induction coil 3 of the second embodiment also is triangular and includes one right angle and two acute angles. The induction coil 3 includes three coils 9, wherein each coil 9 is arranged within one angle of said induction coil 3 in each case. In this embodiment, one of the three coils 9 is circular, while the other two coils 9 are triangular. The both triangular coils 9 have the same sizes and are constructed in the same way. The circular coil 9 is arranged within the right angle of the induction coil 3, while the triangular coils 9 are arranged within the acute angles of said induction coil 3.

FIG. 8 shows the example arrangement of FIG. 2, wherein the inductions coils 3 have the internal structure according to the first embodiment.

The induction coils 3 are spatially distributed over the induction hob base area. The induction coils 3 may be arranged at the carrier plate 6. According to the flexible heating zone concept mentioned above, the induction hob is configured to form the heating zone areas by merging two or more heating zones 4 thereby creating large-size heating zone areas spanning over multiple heating zones 4.

In this embodiment, the eight heating zones 4.1 to 4.8 of the induction hob 1 are associated with the certain induction coils 3, wherein each induction coil 3 includes three circular coils 9. The three coils 9 of each heating zone 4.1 to 4.8 and induction coil 3, respectively, have the same sizes and are constructed in the same way. The use of only one type of coils 9 allows the production of the induction hob 1 by low complexity. In general, the heating zones 4.1 to 4.8 and the induction coils 3, respectively, may include three or more coils 9.

It should be noted that the description and drawings merely illustrate the principles of the proposed induction hob. Those skilled in the art will be able to implement various arrangements that, although not explicitly described or shown herein, embody the principles of the invention.

LIST OF REFERENCE NUMERALS 1 induction hob
2 hob plate
3 induction coil
4 heating zone
4.1-4.8 heating zone
5 pot detection sensor
5.1-5.3 pot detection sensor
6 carrier plate
7 piece of cookware
8 evaluation unit
9 coil
UI user interface

What is claimed is:

1. Induction hob comprising:
a hob plate;
a plurality of induction coils arranged below the hob plate and adapted to form at least one heating zone at the hob plate;
a pot detection sensor; and
an evaluation unit for evaluating signals received from the pot detection sensor; wherein:
the pot detection sensor is a strip-shaped sensor extending at least partially along a dedicated area of the hob plate within a space between a pair of adjacent induction coils of the plurality of induction coils, and
the evaluation unit is adapted to determine information regarding an occupancy level of the pot detection sensor covered by a piece of cookware, wherein the occupancy level is indicative of a portion of the pot detection sensor covered by the piece of cookware placed above the pot detection sensor.

2. Induction hob according to claim 1, wherein the pot detection sensor is a capacity sensor.

3. Induction hob according to claim 1, wherein the dedicated area is selected from:
(a) a heating zone from among the at least one heating zone;
(b) an individual induction coil of the plurality of induction coils;
(c) an area between adjacent heating zones from among the at least one heating zone;
(d) a heat sensitive area;
(e) an input element;
(f) a display element;
(g) a fixing element;
(h) a sealing element; and
(i) an edge of the hob plate.

4. Induction hob according to claim 1, wherein there are provided additional pot detection sensors along said dedicated area of the hob plate to detect percentage of coverage of each of the additional pot detection sensors and a position of where the additional pot detection sensors are covered within said dedicated area.

5. Induction hob according to claim 1, wherein the pot detection sensor comprises at least partially a straight shape.

6. Induction hob according to claim 1, said dedicated area being of straight shape, rounded shape, circular shape, oval shape or generally rectangular shape.

7. Induction hob according to claim 1, wherein the pot detection sensor is formed by a printed line sensor arranged at a carrier plate carrying said plurality of induction coils, wherein said carrier plate is thermally insulating, electrically isolating and/or provided for carrying further electric and/or electronic components.

8. Induction hob according to claim 1, wherein at least two adjacent ones of said plurality of induction coils have a triangular shape in each case.

9. Induction hob according to claim 8, wherein at least one of the at least two adjacent induction coils includes three coils, wherein:
each of the three coils is circular; or
one of the three coils is circular while the other two coils are triangular.

10. Induction hob according to claim 1, comprising:
two or more of said plurality of induction coils arranged below the hob plate in order to form a plurality of heating zones of said at least one heating zone at the hob plate; and
said strip-shaped pot detection sensor at least partially placed between adjacent ones of the two or more of said plurality of induction coils within adjacent ones of the plurality of heating zones.

11. Induction hob according to claim 10, further comprising a control entity adapted to automatically form a common heating zone area including any of said plurality of heating zones based on information provided by the evaluation unit, wherein the control entity receives information regarding an occupancy level of the pot detection sensor and compares received occupancy level information with a threshold level in order to decide whether two pieces of cookware are placed on different ones of said plurality of heating zones which have to be driven independently or a single piece of cookware covers multiple ones of said plurality of heating zones and said multiple heating zones have to be combined in order to form said common heating zone area.

12. Induction hob according to claim 1, wherein the induction hob comprises signalling means for outputting an optic and/or acoustic message based on information provided by the evaluation unit.

13. Induction hob according to claim 11, wherein the control entity is additionally adapted to receive pot identification information from said plurality of induction coils and to evaluate said pot identification information for forming the common heating zone area.

14. Induction hob according to claim 1, wherein there is provided a plurality of said strip-shaped pot detection sensors that are arranged as a matrix throughout the hob plate.

15. Method for controlling an induction hob, the induction hob comprising a hob plate, a plurality of induction coils arranged below the hob plate in order to form at least one heating zone at the hob plate, and a pot detection sensor, said pot detection sensor being a strip-shaped sensor extending at least partially along a dedicated area of the hob plate within a space between a pair of adjacent ones of said plurality of induction coils, and an evaluation unit coupled with the pot detection sensor, the method comprising the steps of:
receiving at the evaluation unit information regarding an occupancy level of the pot detection sensor covered by a piece of cookware, wherein the occupancy level is indicative of a portion of the pot detection sensor covered by the piece of cookware placed above the pot detection sensor;
analyzing the received information regarding the occupancy level thereby deriving information regarding a position and/or size of the piece of cookware placed on the hob plate; and
controlling the induction hob according to the derived position and/or size information.

16. Method according to claim 15, wherein the step of controlling the induction hob comprises triggering a heating zone formation procedure and/or triggering an output at a user interface regarding the position of the piece of cookware.

17. Method according to claim 15, wherein a control entity included in the induction hob receives information regarding the occupancy level of the pot detection sensor positioned between the pair of adjacent ones of said plurality of induction coils and compares the received occupancy level information with a threshold level in order to decide whether two pieces of cookware are placed on the hob plate and have to be driven independently or the single piece of cookware covers multiple heating zones and said multiple heating zones have to be combined in order to form a common heating zone area, wherein the control entity additionally receives pot identification information from one or more of the pair of adjacent induction coils and evaluates said pot identification information for forming the common heating zone area.

18. Method according to claim 15, wherein a control entity included in the induction hob receives information regarding the occupancy level of the pot detection sensor and compares the received information regarding the occupancy level with a threshold level in order to decide whether the position of the piece of cookware is outside a desired area and information regarding a repositioning of the piece of cookware should be provided at a user interface.

19. An induction hob comprising a plurality of induction coils arranged below a hob plate, a plurality of strip-shaped capacitive sensors disposed and extending in spaces located respectively between adjacent ones of said plurality of induction coils, and a control unit adapted to operate said plurality of induction coils in all of the following modes: independently to yield respective individual heating areas specific to the respective induction coils, grouping two or more contiguous ones of said induction coils together to define a common heating area, or grouping together respective groups of contiguous ones of said induction coils to define respective common heating areas, each such common heating area being defined by common operation at a common power level of the contiguous induction coils defining that common heating area, wherein said control unit:
drives together, at a common power level, each pair of adjacent ones of said plurality of induction coils when the strip-shaped capacitive sensor extending within the space therebetween yields a signal above a predetermined capacitance threshold indicative of a threshold level of an occupancy level of that sensor by a cooking utensil placed at least partially thereover on said hob plate, and
drives independently, at independently selected power levels, each said pair of adjacent induction coils when the strip-shaped capacitive sensor extending within the space therebetween yields a signal below said predetermined capacitance level;
wherein three or more contiguous ones of said of said plurality induction coils are grouped and driven together by said control unit to define a common heating area therebetween when all the strip-shaped capacitive sensors between adjacent pairs thereof yield respective capacitance signals above their aforesaid respective predetermined threshold levels;
said strip-shaped capacitive sensors being printed on a thermally insulating and electrically isolating carrier plate carrying said plurality of induction coils.

20. The induction hob according to claim 19, the control unit being further adapted to drive said plurality of induction coils independently or grouped together forming one or more said common heating areas based on further signal information indicating position of where the respective strip-shaped capacitive sensors are covered by said cooking utensil or by a plurality of cooking utensils, and based on pot identification information from one or more of said plurality of induction coils.

21. The induction hob according to claim 1, wherein the evaluation unit is further adapted to determine whether to merge the at least one heating zone to form a common heating zone area based on the occupancy level of the pot detection sensor covered by the piece of cookware disposed on the hob plate at least partially within the at least one heating zone.

22. Induction hob comprising:
a hob plate;
a plurality of induction coils arranged below the hob plate and adapted to form at least one heating zone at the hob plate;
a pot detection sensor; and
an evaluation unit for evaluating signals received from the pot detection sensor; wherein:
the pot detection sensor is a strip-shaped sensor extending at least partially along a dedicated area of the hob plate within a space between a pair of adjacent induction coils of the plurality of induction coils, the pot detection sensor is a capacity sensor, and
the evaluation unit is adapted to determine information regarding an occupancy level of the pot detection sensor covered by a piece of cookware, wherein the occupancy level is indicative of a portion of the pot detection sensor covered by the piece of cookware placed above the pot detection sensor.

23. Induction hob comprising:

a hob plate;

a plurality of induction coils arranged below the hob plate and adapted to form at least one heating zone at the hob plate;

a pot detection sensor; and an evaluation unit for evaluating signals received from the pot detection sensor; wherein:

the pot detection sensor is a strip-shaped sensor extending at least partially along a dedicated area of the hob plate within a space between a pair of adjacent induction coils of the plurality of induction coils, the evaluation unit is adapted to determine information regarding an occupancy level of the pot detection sensor covered by a piece of cookware, wherein the occupancy level is indicative of a portion of the pot detection sensor covered by the piece of cookware placed above the pot detection sensor, at least one of two adjacent ones of said plurality of induction coils includes three coils.

24. The induction hob according to claim 22, wherein each of the three coils is circular; or one of the three coils is circular while the other two coils are triangular.

* * * * *